United States Patent
Kishi et al.

(10) Patent No.: US 10,836,387 B2
(45) Date of Patent: Nov. 17, 2020

(54) VEHICLE AND CONTROL APPARATUS

(71) Applicant: HONDA MOTOR CO., LTD., Tokyo (JP)

(72) Inventors: Takayuki Kishi, Wako (JP); Toshiyuki Mizuno, Wako (JP); Yoshiaki Konishi, Wako (JP); Makoto Kurihara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 68 days.

(21) Appl. No.: 16/227,211

(22) Filed: Dec. 20, 2018

(65) Prior Publication Data

US 2019/0217860 A1   Jul. 18, 2019

(30) Foreign Application Priority Data

Jan. 15, 2018   (JP) .................................. 2018-004441

(51) Int. Cl.
*B60W 10/02*   (2006.01)
*B60W 10/11*   (2012.01)
(Continued)

(52) U.S. Cl.
CPC .......... *B60W 30/16* (2013.01); *B60W 10/113* (2013.01); *B60W 10/115* (2013.01);
(Continued)

(58) Field of Classification Search
CPC .. B60W 10/11; B60W 10/113; B60W 10/115; B60W 10/02; B60W 10/196;
(Continued)

(56) References Cited

U.S. PATENT DOCUMENTS

| 5,529,139 A | 6/1996 | Kurahashi et al. |
| 7,513,848 B2 | 4/2009 | Inoue et al. |
(Continued)

FOREIGN PATENT DOCUMENTS

| JP | H09-207613 A | 8/1997 |
| JP | H11-170889 A | 6/1999 |
(Continued)

OTHER PUBLICATIONS

Japanese Office Action (w/ partial translation) issued for Japanese Patent Application No. 2018-004441 dated Sep. 2, 2019.

*Primary Examiner* — Edwin A Young
(74) *Attorney, Agent, or Firm* — Thomas Horstemeyer, LLP

(57) ABSTRACT

A vehicle includes: an automatic transmission configured to select a gear from a plurality of gears by switching engagement of a plurality of friction engaging mechanisms; a determination unit configured to determine whether a predetermined deceleration condition is satisfied during traveling; and an engagement control unit configured to control the plurality of friction engaging mechanisms. If the determination unit determines that the predetermined deceleration condition is satisfied, the engagement control unit decelerates the vehicle by controlling, in addition to a friction engaging mechanism corresponding to a current gear among the plurality of friction engaging mechanisms, a degree of engagement of another friction engaging mechanism that can generate interlock of the automatic transmission.

12 Claims, 10 Drawing Sheets

(51) Int. Cl.
  *B60W 30/16* (2020.01)
  *B60W 30/02* (2012.01)
  *B60W 10/184* (2012.01)
  *B60W 10/113* (2012.01)
  *B60W 10/196* (2012.01)
  *F16H 3/00* (2006.01)
  *F16H 37/04* (2006.01)
  *B60W 20/30* (2016.01)
  *B60W 10/115* (2012.01)

(52) U.S. Cl.
  CPC ........ *B60W 10/184* (2013.01); *B60W 10/196* (2013.01); *B60W 20/30* (2013.01); *B60W 30/025* (2013.01); *F16H 3/006* (2013.01); *F16H 37/042* (2013.01); *B60W 2400/00* (2013.01); *B60W 2520/10* (2013.01); *B60W 2552/15* (2020.02); *B60W 2710/1005* (2013.01); *B60W 2710/18* (2013.01); *B60W 2754/30* (2020.02); *B60Y 2200/92* (2013.01)

(58) Field of Classification Search
  CPC .. B60W 30/14; B60W 30/143; B60W 30/146; B60W 30/16; B60W 30/162; B60W 30/165; B60W 30/18136; B60W 2030/18081
  See application file for complete search history.

(56) References Cited

U.S. PATENT DOCUMENTS

| | | | |
|---|---|---|---|
| 8,788,166 B1 * | 7/2014 | Kucharski | F16H 61/061 477/107 |
| 2006/0248971 A1 | 11/2006 | Inoue et al. | |
| 2015/0219211 A1 * | 8/2015 | Schiele | F16D 48/06 701/51 |
| 2017/0327116 A1 * | 11/2017 | Heo | B60W 30/18018 |

FOREIGN PATENT DOCUMENTS

| | | |
|---|---|---|
| JP | 2000-225869 A | 8/2000 |
| JP | 2006-307966 A | 11/2006 |

* cited by examiner

FIG. 9A

|     | C11 | C12 | C13 | B1 | B2 | B3 | F1 | GEAR RATIO |
|---|---|---|---|---|---|---|---|---|
| RVS |   |   | ○ |   | ○ |   | ○ | 4.008 |
| 1st |   |   |   | ○ | ○ | (○) | △/○ | 5.233 |
| 2nd |   | ○ |   | ○ | ○ |   | (△) | 3.367 |
| 3rd |   |   | ○ | ○ | ○ |   | (△) | 2.298 |
| 4th |   | ○ | ○ | ○ |   |   | (△) | 1.705 |
| 5th | ○ |   | ○ | ○ |   |   | (△) | 1.363 |
| 6th | ○ | ○ | ○ |   |   |   | (△) | 1.000 |
| 7th | ○ |   | ○ |   | ○ |   | (△) | 0.786 |
| 8th | ○ | ○ |   |   | ○ |   | (△) | 0.657 |
| 9th | ○ |   |   |   | ○ | ○ | (△) | 0.584 |
| 10th | ○ | ○ |   |   |   | ○ | (△) | 0.520 |
| P/N |   |   |   |   |   |   | △/○ | — |

FIG. 9B

| PLANETARY GEAR MECHANISM | GEAR RATIO |
|---|---|
| P1 | 2.681 |
| P2 | 1.914 |
| P3 | 1.614 |
| P4 | 2.734 |

VEHICLE AND CONTROL APPARATUS

CROSS-REFERENCE TO RELATED APPLICATION

This application claims priority to and the benefit of Japanese Patent Application No. 2018-004441 filed on Jan. 15, 2018, the entire disclosure of which is incorporated herein by reference.

BACKGROUND OF THE INVENTION

Field of the Invention

The present invention relates to a technique of controlling a vehicle including an automatic transmission.

Description of the Related Art

As a driving support technique of a vehicle, there is known a control technique of maintaining a constant vehicle speed and a constant following distance to a preceding vehicle, as represented by automatic cruise (for example, Japanese Patent Laid-Open No. 2000-225869). In such control, to decelerate a vehicle, it is known to use the actuation of a brake device, a decrease in rotation speed of an engine, or the shift-down of an automatic transmission.

If the brake device is often actuated, a traffic flow on the periphery may worsen due to the lighting of a brake lamp. In deceleration by the automatic transmission, the shift-down may cause a gear change shock or change the engine speed, thereby influencing ride comfort. Additionally, responsiveness to a fine change in speed is not always high.

SUMMARY OF THE INVENTION

The present invention provides a technique of making it possible to decelerate a vehicle relatively smoothly and quickly by an automatic transmission.

According to an aspect of the present invention, there is provided a vehicle comprising: an automatic transmission configured to select a gear from a plurality of gears by switching engagement of a plurality of friction engaging mechanisms; a determination unit configured to determine whether a predetermined deceleration condition is satisfied during traveling; and an engagement control unit configured to control the plurality of friction engaging mechanisms, wherein if the determination unit determines that the predetermined deceleration condition is satisfied, the engagement control unit decelerates the vehicle by controlling, in addition to a friction engaging mechanism corresponding to a current gear among the plurality of friction engaging mechanisms, a degree of engagement of another friction engaging mechanism that can generate interlock of the automatic transmission.

Further features of the present invention will become apparent from the following description of exemplary embodiments (with reference to the attached drawings).

BRIEF DESCRIPTION OF THE DRAWINGS

FIG. 9A is a table showing an example of an engaging table of engaging mechanisms;
FIG. 9B is a table showing the gear ratios of planetary gear mechanisms.

DESCRIPTION OF THE EMBODIMENTS

Figure 1:
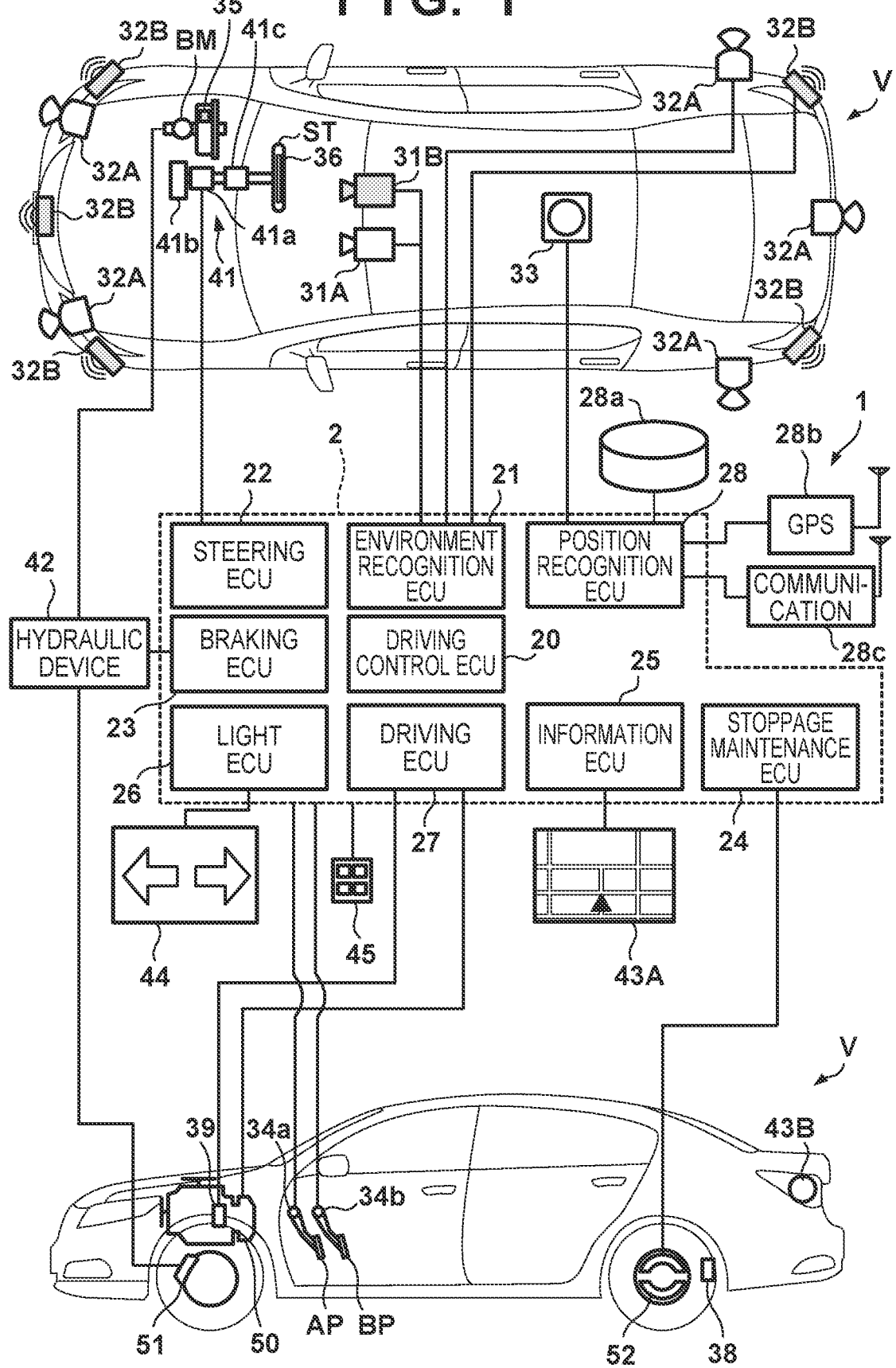
FIG. 1 is a block diagram of a vehicle and a control apparatus according to an embodiment.

FIG. 1 is a block diagram of a vehicle V and a control apparatus 1 for the vehicle V according to an embodiment of the present invention. Referring to FIG. 1, plan views and side views show an outline of the vehicle V. As an example, the vehicle V is a sedan-type four-wheeled vehicle.

The vehicle V according to this embodiment is, for example, a parallel-type hybrid vehicle. In this case, a power plant 50 that outputs a driving force to rotate the driving wheels of the vehicle V can be formed by an internal combustion engine, a motor, and an automatic transmission. The motor can be used as a driving source configured to accelerate the vehicle V and can also be used as a power generator at the time of deceleration or the like (regenerative braking).

<Control Apparatus 1>

The arrangement of the control apparatus 1 will be described with reference to FIG. 1. The control apparatus 1 includes an ECU group (control unit group) 2. The ECU group 2 includes a plurality of ECUs 20 to 28 configured to be communicable with each other. Each ECU includes a processor represented by a CPU, a storage device such as a semiconductor memory, and an interface to an external device. The storage device stores programs to be executed by the processor, data to be used by the processor for processing, and the like. Each ECU may include a plurality of processors, storage devices, and interfaces. Note that the number of ECUs and the provided functions can appropriately be designed, and they can be subdivided or integrated as compared to this embodiment. Note that in FIG. 1, the names of representative functions of the ECUs 20 to 28 are added. For example, the ECU 20 is described as "driving control ECU".

The ECU 20 executes control associated with traveling support including automated driving of the vehicle V. In automated driving, driving (acceleration or the like of the vehicle V by the power plant 50), steering, and braking of the vehicle V are automatically performed without requiring an operation of the driver. Additionally, in manual driving, the ECU 20 can execute, for example, traveling support control such as collision reduction brake or lane departure suppression. In the collision reduction brake, when the possibility of collision against a front obstacle rises, actuation of a brake device 51 is instructed to support collision avoidance. In the lane departure suppression, when the possibility of departure of the vehicle V from the lane in which it travels rises, actuation of an electric power steering device 41 is instructed to support lane departure avoidance.

The ECU 21 is an environment recognition unit configured to recognize the traveling environment of the vehicle V based on the detection results of detection units 31A, 31B, 32A, and 32B configured to detect the ambient situation of the vehicle V. In this embodiment, the detection units 31A and 31B are cameras (to be sometimes referred to as the cameras 31A and 31B hereinafter) that capture the front side of the vehicle V and are provided on the roof front of the vehicle V. When images captured by the cameras 31A and 31B are analyzed, the contour of a target or a division line (a white line or the like) of a lane on a road can be extracted.

In this embodiment, the detection unit 32A is a lidar (Light Detection and Ranging) (to be sometimes referred to as the lidar 32A hereinafter), and detects a target on the periphery of the vehicle V or measures the distance to a target. In this embodiment, five lidars 32A are provided; one at each corner of the front portion of the vehicle V, one at the center of the rear portion, and one on each side of the rear portion. The detection unit 32B is a millimeter wave radar (to be sometimes referred to as the radar 32B hereinafter), and detects a target on the periphery of the vehicle V or measures the distance to a target. In this embodiment, five radars 32B are provided; one at the center of the front portion of the vehicle V, one at each corner of the front portion, and one at each corner of the rear portion.

The ECU 22 is a steering control unit configured to control the electric power steering device 41. The electric power steering device 41 includes a mechanism that steers the front wheels in accordance with the driving operation (steering operation) of the driver on a steering wheel ST. The electric power steering device 41 includes a driving unit 41a including a motor that generates a driving force (to be sometimes referred to as a steering assist torque) to assist the steering operation or automatically steer the front wheels, a steering angle sensor 41b, and a torque sensor 41c that detects a steering torque (to be referred to as a steering burden torque which is discriminated from the steering assist torque) borne by the driver. The ECU 22 can also acquire the detection result of a sensor 36 configured to detect whether the driver is gripping a steering wheel ST, and can monitor the grip state of the driver.

The ECU 23 is a braking control unit configured to control a hydraulic device 42. The braking operation of the driver on a brake pedal BP is converted into a liquid pressure by a brake master cylinder BM and transmitted to the hydraulic device 42. The hydraulic device 42 is an actuator capable of controlling the liquid pressure of hydraulic oil supplied to the brake device (for example, a disc brake device) 51 provided on each of the four wheels based on the liquid pressure transmitted from the brake master cylinder BM, and the ECU 23 controls driving of a solenoid valve and the like provided in the hydraulic device 42. At the time of braking, the ECU 23 can light a brake lamp 43B. This can raise the attention of a following vehicle to the vehicle V.

The ECU 23 and the hydraulic device 42 can form an electric servo brake. The ECU 23 can control, for example, distribution of a braking force by the four brake devices 51 and a braking force by regenerative braking of the motor provided in the power plant 50. The ECU 23 can also implement an ABS function, traction control, and the posture control function of the vehicle V based on the detection results of a wheel speed sensor 38 provided on each of the four wheels, a yaw rate sensor (not shown), and a pressure sensor 35 that detects the pressure in the brake master cylinder BM.

The ECU 24 is a stoppage maintenance control unit configured to control an electric parking brake device (for example, a drum brake) 52 provided on the rear wheels. The electric parking brake device 52 includes a mechanism that locks the rear wheels. The ECU 24 can control locking of the rear wheels and unlocking by the electric parking brake device 52.

The ECU 25 is an internal notification control unit configured to control an information output device 43A that makes a notification of information in the vehicle. The information output device 43A includes, for example, a head up display, a display device provided on an instrument panel, or a sound output device. The information output device 43A may also include a vibration device. The ECU 25 causes the information output device 43A to output, for example, various kinds of information such as a vehicle speed and an outside temperature, information such as a route guide, and information about the state of the vehicle V.

The ECU 26 is an external notification control unit configured to control an information output device 44 that makes a notification of information outside the vehicle. In this embodiment, the information output device 44 is a direction indicator (hazard lamp). The ECU 26 can make a notification of the advancing direction of the vehicle V outside the vehicle by controlling blinking of the information output device 44 serving as a direction indicator and can also attract attention to the vehicle V by controlling blinking of the information output device 44 serving as a hazard lamp.

The ECU 27 is a driving control unit configured to control the power plant 50. In this embodiment, one ECU 27 is assigned to the power plant 50. However, one ECU may be assigned to each of the internal combustion engine, the motor, and the automatic transmission. The ECU 27, for example, controls the output of the internal combustion engine or the motor or switches the gear of the automatic transmission in correspondence with the driving operation of the driver or the vehicle speed detected by an operation detection sensor 34a provided on an accelerator pedal AP or an operation detection sensor 34b provided on the brake pedal BP. Note that the automatic transmission is provided with a rotation speed sensor 39 configured to detect the rotation speed of the output shaft of the automatic transmission as a sensor that detects the traveling state of the vehicle V. The vehicle speed of the vehicle V can be calculated from the detection result of the rotation speed sensor 39.

The ECU 28 is a position recognition unit configured to recognize the current position or track of the vehicle V. The ECU 28 performs control of a gyro sensor 33, a GPS sensor 28b, and a communication device 28c and information processing of a detection result or a communication result. The gyro sensor 33 detects the rotary motion of the vehicle V. The track of the vehicle V can be determined based on the detection result of the gyro sensor 33 and the like. The GPS sensor 28b detects the current position of the vehicle V. The communication device 28c performs wireless communication with a server that provides map information and traffic information and acquires these pieces of information. A database 28a can store accurate map information. The ECU 28 can more accurately specify the position of the vehicle V on a lane based on the map information and the like.

An input device 45 is arranged inside the vehicle so as to be operable by the driver and accepts instruction or information input from the driver.

<Power Plant 50>

Figure 2:
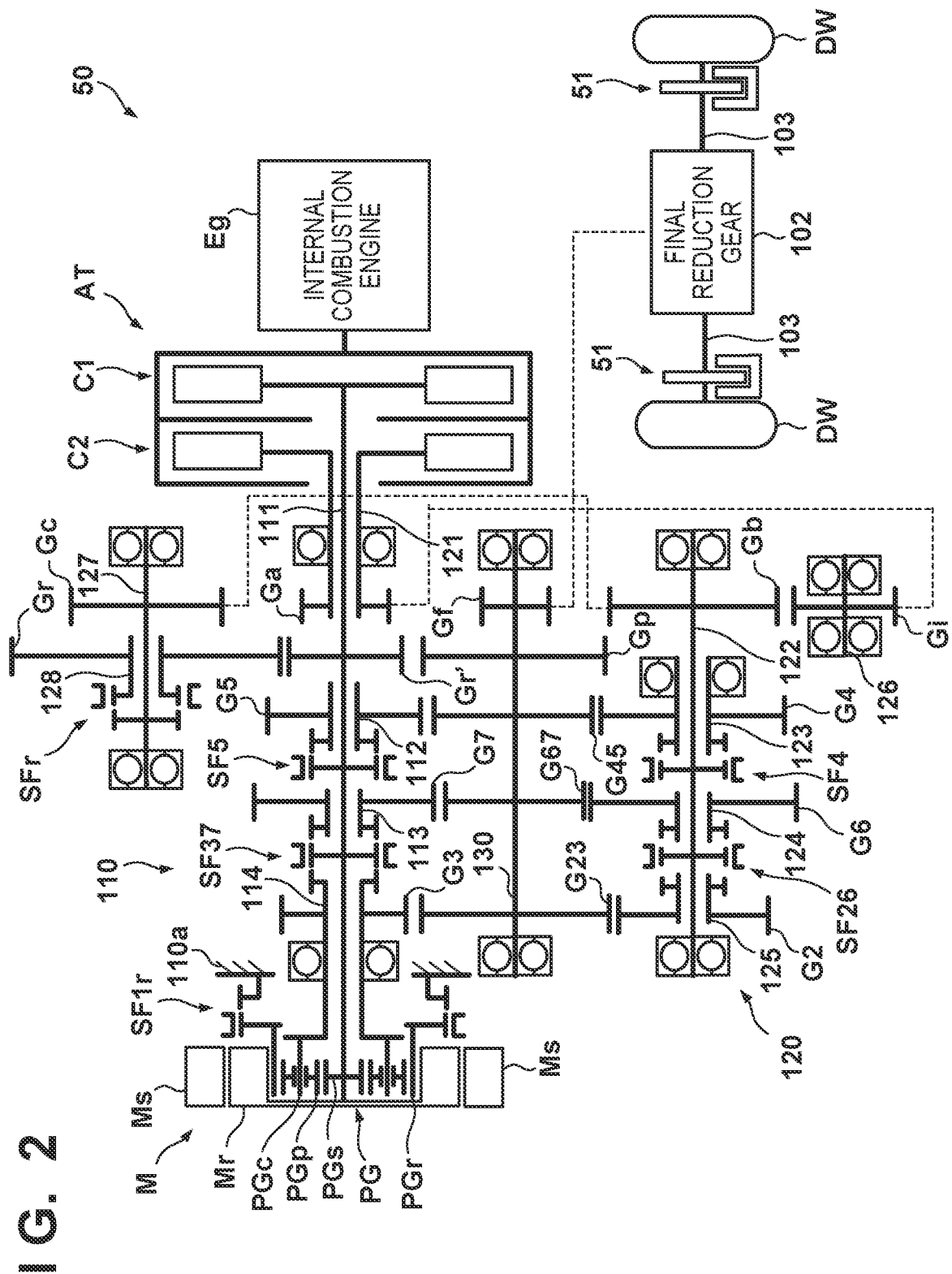
FIG. 2 is a skeleton diagram showing an example of a power plant.

FIG. 2 is a skeleton diagram showing an example of the arrangement of the power plant 50. In the example shown in FIG. 2, the power plant 50 includes an internal combustion engine Eg, an automatic transmission AT, and an electric motor (motor) M. A driving force output from the internal combustion engine Eg or the electric motor M is transmitted to driving shafts 103 via the automatic transmission AT and a final reduction gear 102 to rotate driving wheels DW.

The internal combustion engine Eg is, for example, a gasoline engine, and includes an output shaft (crankshaft) to which clutches C1 and C2 are connected as starting devices. The clutch C1 connects/disconnects the internal combustion engine Eg and a transmission mechanism 110, more particularly, a main shaft 111 of the automatic transmission AT, and the clutch C2 connects/disconnects the internal combustion engine Eg and a transmission mechanism 120, more particularly, a main shaft 121 of the automatic transmission AT. The clutches C1 and C2 are friction engaging mechanisms, and are, for example, friction disc clutches. The clutches C1 and C2 are driven by, for example, a hydraulic actuator, and the ECU 27 controls its hydraulic control valve. The same applies to each shifter (to be described later).

The electric motor M is, for example, a 3-phase brushless motor, and includes a rotor Mr and a stator Ms. The electric motor M is supplied with power from an inverter (not shown) to output a driving force (power running), and also functions as a power generator to accumulate power in a capacitor (not shown) (regeneration). It is possible to obtain a braking force using a rotational resistance generated in the rotor Mr during regeneration.

In this embodiment, the electric motor M is connected to the transmission mechanism 110. More specifically, the electric motor M is arranged to be coaxial with the main shaft 111 of the transmission mechanism 110, and the rotor Mr of the electric motor M is fixed to the end portion of the main shaft 111 of the transmission mechanism 110, and rotates coaxially with the main shaft 111. Therefore, the rotational force of the main shaft 111 is always transmitted to the rotor Mr. In this embodiment, the main shaft 111 and the rotor Mr are fixed. However, an arbitrary arrangement in which the rotational force of the main shaft 111 is always transmitted to the electric motor M can be employed.

The final reduction gear 102 includes a differential mechanism connected to the driving shafts 103, and transmits power to the automatic transmission AT via an output gear Gf of the automatic transmission AT.

The automatic transmission AT is a transmission having gears of seven forward gears and one reverse gears, and is a dual clutch type transmission mainly formed by the transmission mechanism 110 and the clutch C1 for implementing odd-numbered gears and the transmission mechanism 120 and the clutch C2 for implementing the even-numbered gears and reverse gear.

The transmission mechanism 110 includes the main shaft 111 with one end portion fixed to the clutch C1 and the other end portion fixed to the rotor Mr of the electric motor M. A driven gear Gr' that always meshes with the driving gear Gr for the reverse range is fixed to the main shaft 111.

A sun gear PGs of a planetary gear mechanism PG is fixed to the other end portion of the main shaft 111. The planetary gear mechanism PG is arranged to be coaxial with the main shaft 111, and includes the sun gear PGs, a ring gear PGr, a pinion gear PGp that meshes with the sun gear PGs and the ring gear PGr, and a carrier PGc that supports the pinion gear PGp to be rotatable and can rotate about the main shaft 111.

The carrier PGc is a tubular body coaxial with the main shaft 111, and is supported by a connecting shaft 114 that is supported to be rotatable coaxially with the main shaft 111. A driving gear G3 for the 3rd gear is fixed to the connecting shaft 114. The connecting shaft 114, the carrier PGc, the pinion gear PGp, and the driving gear G3 are integrally rotatable coaxially with the main shaft 111.

Connecting shafts 112 and 113 are tubular bodies coaxial with the main shaft 111, and are supported to be rotatable coaxially with the main shaft 111. A driving gear G5 for the 5th gear is fixed to the connecting shaft 112, and a driving gear G7 for the 7th gear is fixed to the connecting shaft 113. Each of a set of the connecting shaft 112 and the driving gear G5 and a set of the connecting shaft 113 and the driving gear G7 is integrally rotatable coaxially with the main shaft 111.

A shifter SF1r for the 1st and reverse gears connects/releases the ring gear PGr of the planetary gear mechanism PG and a transmission case 110a. A shifter SF37 for the 3rd and 7th gears connects/releases the main shaft 111 and the connecting shaft 114 (driving gear G3), and connects/releases the main shaft 111 and the connecting shaft 113 (driving gear G7). A shifter SF5 for the 5th gear connects/releases the main shaft 111 and the connecting shaft 112 (driving gear G5). These shifters are mechanical engaging mechanisms such as a dog clutch/brake.

The transmission mechanism 120 is a tubular body coaxial with the main shaft 111, and includes the main shaft 121 supported to be rotatable coaxially with the main shaft 111. The clutch C2 is fixed to one end portion of the main shaft 121, and a gear Ga is fixed to the other end portion of the main shaft 121.

The transmission mechanism 120 includes, in parallel to the main shaft 121, an intermediate shaft 122 and an idling shaft 126 provided to be rotatable. An idling gear Gi that always meshes with the gear Ga is fixed to the idling shaft 126. A gear Gb that always meshes with the idling gear Gi is fixed to the intermediate shaft 122.

Connecting shafts 123 to 125 are tubular bodies coaxial with the intermediate shaft 122, and are supported to be rotatable coaxially with the intermediate shaft 122. A driving gear G4 for the 4th gear, a driving gear G6 for the 6th gear, and a driving gear G2 for the 2nd gear are fixed to the connecting shafts 123, 124, and 125, respectively, and each set of the driving gear and the connecting shaft is integrally rotatable coaxially with the intermediate shaft 122.

A shifter SF26 for the 2nd and 6th gears connects/releases the intermediate shaft 122 and the connecting shaft 125 (driving gear G2), and connects/releases the intermediate shaft 122 and the connecting shaft 124 (driving gear G6). A shifter SF4 for the 4th gear connects/releases the intermediate shaft 122 and the connecting shaft 123 (driving gear G4). These shifters are mechanical engaging mechanisms such as a dog clutch.

The transmission mechanism 120 includes, in parallel to the main shaft 121, an intermediate shaft 127 provided to be rotatable. A gear Gc that always meshes with the gear Gb is fixed to the intermediate shaft 127. A connecting shaft 128 is a tubular body coaxial with the intermediate shaft 127, and is supported to be rotatable coaxially with the intermediate shaft 127. The driving gear Gr for the reverse range is fixed to the connecting shaft 128. A shifter SFr for the reverse range connects/releases the intermediate shaft 127 and the connecting shaft 128 (driving gear Gr). This shifter SFr is a mechanical engaging mechanism such as a dog clutch.

The automatic transmission AT includes, in parallel to the main shaft 111, a counter shaft 130 provided to be rotatable. The output gear Gf that always meshes with the differential mechanism of the final reduction gear 102, a parking gear Gp forming a parking lock mechanism, a driven gear G45 for the 4th/5th gear, a driven gear G67 for the 6th/7th gear, and a driven gear G23 for the 2nd/3rd gear are fixed to the counter shaft 130.

The driven gear G45 always meshes with the driving gears G4 and G5. The driven gear G67 always meshes with the driving gears G6 and G7. The driven gear G23 always meshes with the driving gears G2 and G3.

A mode at the time of selection of each gear of the automatic transmission AT with the above arrangement when the internal combustion engine Eg is used as a driving source will be described. A case in which each of the 1st, 3rd, 5th, and 7th gears is selected will be explained first. When each of these gears is selected, the clutch C1 is set in an engaging state and the clutch C2 is set in a release state.

In the 1st gear, the shifter SF1r connects the ring gear PGr of the planetary gear mechanism PG and a transmission case 110a to each other. Then, power is transmitted along a path of internal combustion engine Eg→clutch C1→main shaft 111/sun gear PGs→pinion gear PGp/carrier PGc/connecting shaft 114/driving gear G3→driven gear G23/counter shaft 130/output gear Gf→final reduction gear 102, thereby establishing the 1st gear.

In the 3rd gear, the shifter SF37 connects the main shaft 111 and the connecting shaft 114 to each other. Then, power is transmitted along a path of internal combustion engine Eg→clutch C1→main shaft 111/connecting shaft 114/driving gear G3→driven gear G23/counter shaft 130/output gear Gf→final reduction gear 102, thereby establishing the 3rd gear.

In the 5th gear, the shifter SF5 connects the main shaft 111 and the connecting shaft 112 to each other. Then, power is transmitted along a path of internal combustion engine Eg→clutch C1→main shaft 111/connecting shaft 112/driving gear G5→driven gear G45/counter shaft 130/output gear Gf→final reduction gear 102, thereby establishing the 5th gear.

In the 7th gear, the shifter SF37 connects the main shaft 111 and the connecting shaft 113 to each other. Then, power is transmitted along a path of internal combustion engine Eg→clutch C1→main shaft 111/connecting shaft 113/driving gear G7→driven gear G67/counter shaft 130/output gear Gf→final reduction gear 102, thereby establishing the 7th gear.

When each of the 2nd, 4th, and 6th gears is selected, the clutch C1 is set in the release state and the clutch C2 is set in the engaging state.

In the 2nd gear, the shifter SF26 connects the intermediate shaft 122 and the connecting shaft 125 to each other. Then, power is transmitted along a path of internal combustion engine Eg→clutch C2→main shaft 121/gear Ga→idling gear Gi→gear Gb/intermediate shaft 122/connecting shaft 125/driving gear G2→driven gear G23/counter shaft 130/output gear Gf→final reduction gear 102, thereby establishing the 2nd gear.

In the 4th gear, the shifter SF4 connects the intermediate shaft 122 and the connecting shaft 123 to each other. Then, power is transmitted along a path of internal combustion engine Eg→clutch C2→main shaft 121/gear Ga→idling gear Gi→gear Gb/intermediate shaft 122/connecting shaft 123/driving gear G4→driven gear G45/counter shaft 130/output gear Gf→final reduction gear 102, thereby establishing the 4th gear.

In the 6th gear, the shifter SF26 connects the intermediate shaft 122 and the connecting shaft 124 to each other. Then, power is transmitted along a path of internal combustion engine Eg→clutch C2→main shaft 121/gear Ga→idling gear Gi→gear Gb/intermediate shaft 122/connecting shaft 124/driving gear G6→driven gear G67/counter shaft 30/output gear Gf→final reduction gear 102, thereby establishing the 6th gear.

The 1st to 7th gears can thus be implemented. When the gear is shifted up or down by one step, it is possible to switch the gear to the next one by the shifter and stand by before switching engagement/release of the clutches C1 and C2, thereby reducing the gear change time.

When selecting the reverse gear, the clutch C1 is set in the release state and the clutch C2 is set in the engaging state. The shifter SFr connects the intermediate shaft 127 and the connecting shaft 128 to each other, and the shifter SF1r connects the ring gear PGr of the planetary gear mechanism PG and the transmission case 110a to each other. Then, power is transmitted along a path of internal combustion engine Eg→clutch C2→main shaft 121/gear Ga→idling gear Gi→gear Gb→gear Gc/intermediate shaft 127/connecting shaft 128/driving gear Gr→driven gear Gr'/main shaft 111/sun gear PGs→pinion gear PGp/carrier PGc/connecting shaft 114/driving gear G3→driven gear G23/counter shaft 130/output gear Gf→final reduction gear 102, thereby implementing the reverse gear.

The shift control of the automatic transmission AT is performed with reference to a transmission map stored in the storage device of the ECU 27. In a case of shift-up, shift control is performed by one step like 1st gear→2nd gear→3rd gear→ . . . 7th gear. Similarly, in a case of shift-down, shift control can be performed by one step like 7th gear→6th gear→5th gear→ . . . 1st gear.

<Example of Control>

Figure 3:
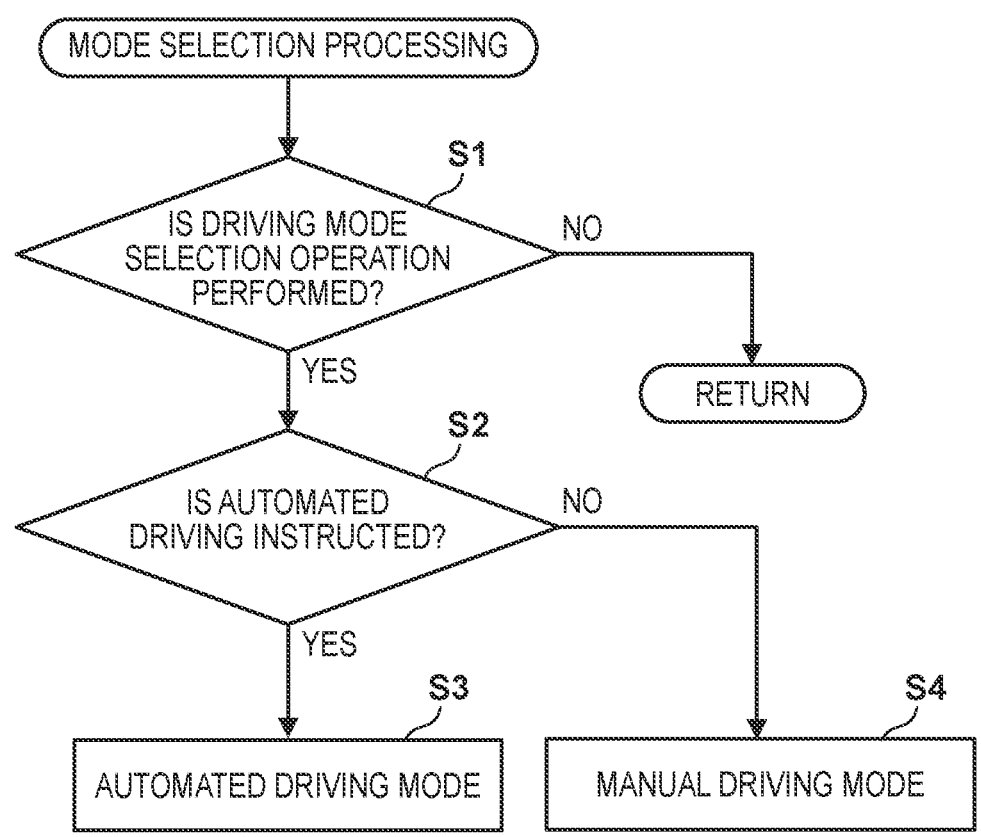
FIG. 3 is a flowchart illustrating an example of processing executed by the control apparatus for the vehicle shown in FIG. 1.

An example of control of the vehicle control system 1 will be described. FIG. 3 is a flowchart illustrating driving control mode selection processing executed by the ECU 20.

In step S1, it is determined whether a mode selection operation is performed by a driver. The driver can send an instruction to switch between an automated driving mode and a manual driving mode by, for example, operating the input device 45. If a selection operation is performed, the process advances to step S2; otherwise, the process ends.

In step S2, it is determined whether the selection operation is an operation of instructing automated driving. If the selection operation is an operation of instructing automated driving, the process advances to step S3. If the selection operation is an operation of instructing manual driving, the process advances to step S4. In step S3, the automated driving mode is set to start automated driving control. In step S4, the manual driving mode is set to start manual driving control. Each of the ECUs 21 to 28 is notified of the current setting about the driving control mode from the ECU 20, and recognizes it.

In manual driving control, driving, steering, and braking of the vehicle V are performed in accordance with the driving operation of the driver, and the ECU 20 executes traveling support control appropriately. In automated driving control, the ECU 20 outputs control commands to the ECUs 22, 23, and 27 to control steering, braking, and driving of the vehicle V, thereby causing the vehicle V to travel automatically regardless of the driving operation of the driver. The ECU 20 sets a traveling route of the vehicle V, and causes the vehicle V to travel along the set traveling route with reference to the position recognition result of the ECU 28 and a target recognition result. A target is recognized based on the detection results of the detection units 31A, 31B, 32A, and 32B.

Next, deceleration control (to be also referred to as AT deceleration control hereinafter) of the vehicle V using the internal resistance of the automatic transmission AT will be described. In automatic cruise in which a vehicle follows a preceding vehicle while maintaining a constant following distance to the preceding vehicle or automatic cruise in which a vehicle travels while maintaining a vehicle speed within a predetermined range, the frequency of braking for vehicle speed adjustment may become high. In this case, if the brake device 51 is often used, a traffic flow on the periphery may worsen due to the lighting of the brake lamp 43B. On the other hand, in a case of shift-down of the automatic transmission AT, a rise in rotation speed of the internal combustion engine Eg may give a sense of incongruity to an occupant. To cope with this problem, in this embodiment, while one of the clutches C1 and C2 is in the engaging state, AT deceleration control of adjusting the engaging state of the other clutch is performed to readily make the engine brake effective, thereby decelerating the vehicle V.

Figure 4:
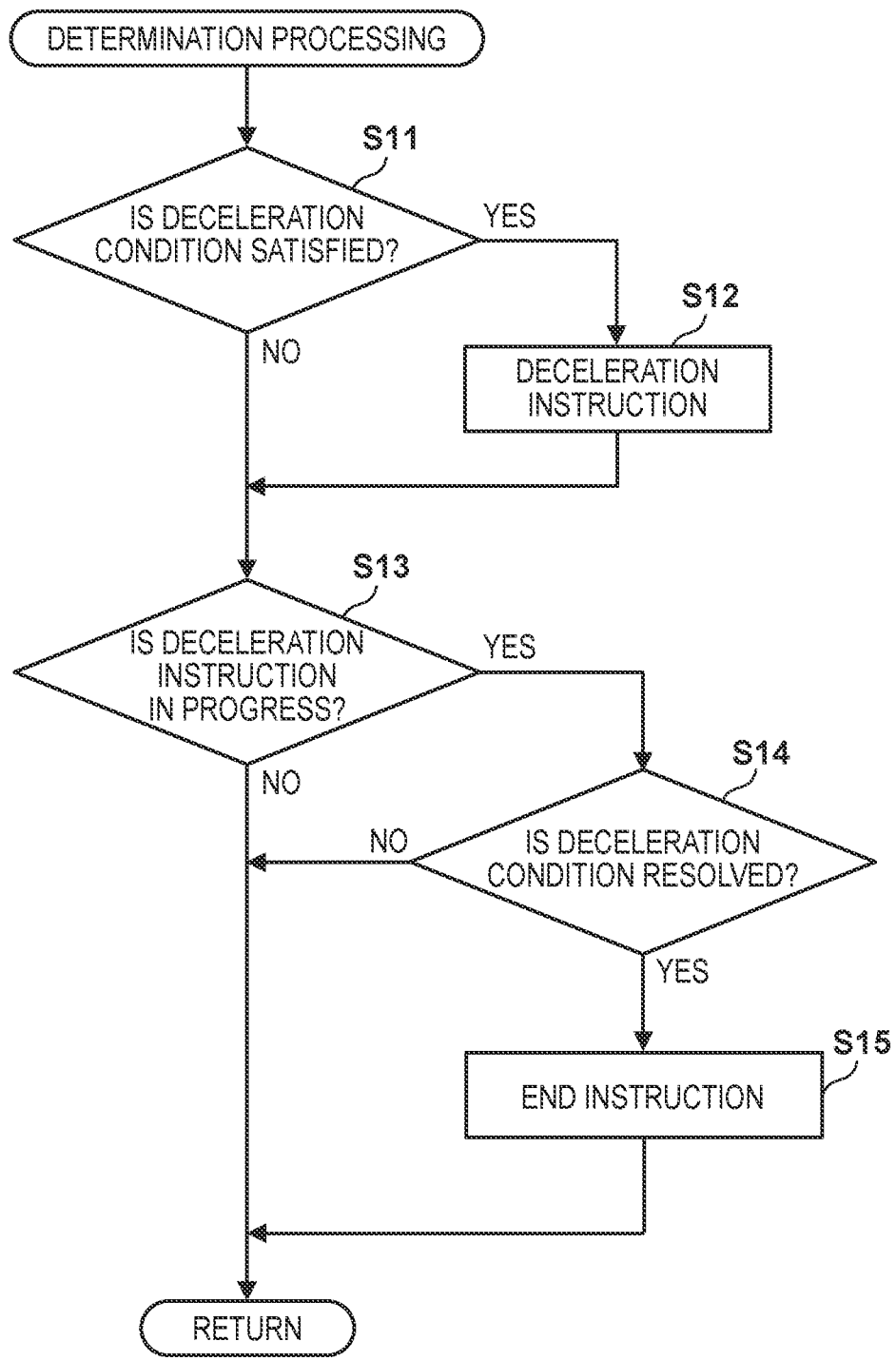
FIG. 4 is a flowchart illustrating an example of processing executed by the control apparatus for the vehicle shown in FIG. 1.

FIG. 4 shows an example of processing of determining whether to execute AT deceleration control. In this embodiment, this processing is executed by the ECU 20. In step S11, it is determined whether a predetermined deceleration condition is satisfied. Examples of the deceleration condition will be described later. If the predetermined deceleration condition is satisfied, the process advances to step S12; otherwise, the process advances to step S13. In step S12, an AT deceleration control execution instruction is output to the ECU 27. In step S13, it is determined whether a deceleration instruction is in progress. If the deceleration instruction is in progress, the process advances to step S14; otherwise, the determination processing ends. Note that "the deceleration instruction is in progress" indicates a period from when the deceleration instruction is output in step S12 until an end instruction is output in step S15.

In step S14, it is determined whether the deceleration condition that has been determined in step S11 to be satisfied is resolved (is not satisfied). If the deceleration condition is resolved, the process advances to step S15; otherwise, the determination processing ends. In step S15, an AT deceleration control end instruction is output to the ECU 27. After that, the determination processing ends.

Figure 5A:
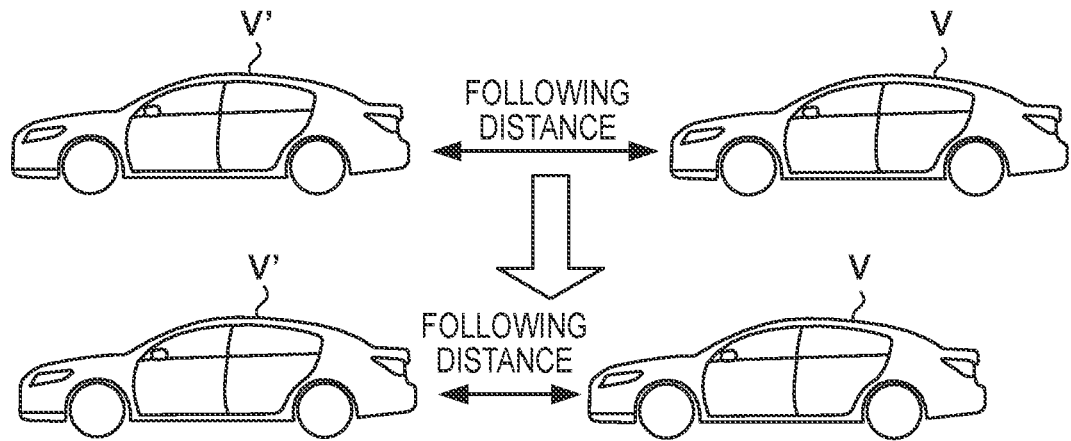
FIGS. 5A to 5C are explanatory views of deceleration conditions.
Figure 5B:
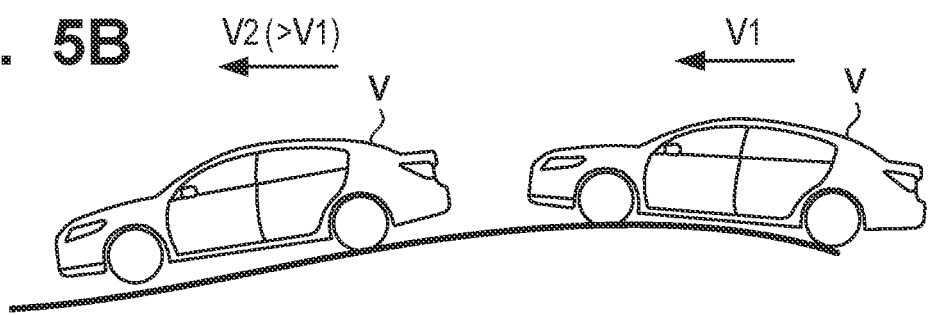
Figure 5C:
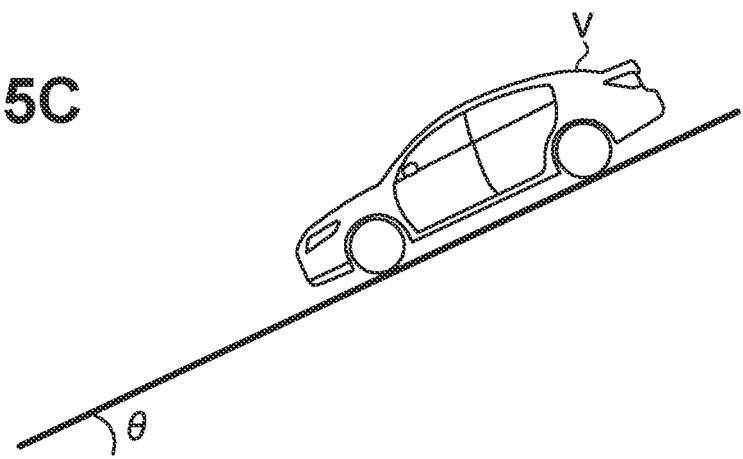

FIGS. 5A to 5C show examples of the deceleration condition in step S11. FIG. 5A exemplifies, as the deceleration condition, a case in which a following distance decreases below a set following distance during automatic cruise in which the self-vehicle V follows a preceding vehicle V' while maintaining a constant following distance between the preceding vehicle V' and the self-vehicle V. The following distance between the preceding vehicle V' and the self-vehicle V can be obtained from, for example, the recognition result of the ECU 21 based on the detection results of the detection units 31A, 31B, 32A, and 32B. Since the following distance often varies easily depending on the driving mode of the preceding vehicle V' and the characteristics of the road, AT deceleration control using the clutches C1 and C2 is appropriate.

Note that even if the following distance decreases below the set following distance, if the preceding vehicle V' is braked, actuation of the brake device 51 is prioritized, and AT deceleration control need not be performed. Since the brake lamp of the preceding vehicle V' also lights up, even if the brake lamp 43B of the self-vehicle V lights up, a traffic flow on the periphery does not worsen due to only the self-vehicle V. The preceding vehicle V' may be braked suddenly. Furthermore, AT deceleration control uses the clutches C1 and C2 as friction engaging mechanisms, and thus the clutches C1 and C2 generate heat. Therefore, if the preceding vehicle V' is braked, the frequency at which AT deceleration control is executed is decreased to reduce the generated heat. Whether the preceding vehicle V' is braked or not is determined based on, for example, the presence/absence of the lighting of the brake lamp of the preceding vehicle V'. This can be obtained from the recognition result of the ECU 21 based on the detection results (capturing results) of the detection units 31A and 31B.

FIG. 5B exemplifies, as the deceleration condition, a case in which a vehicle speed exceeds a set vehicle speed during automatic cruise in which the self-vehicle V travels alone while maintaining the vehicle speed of the self-vehicle V within a predetermined range. In the example shown in FIG. 5B, the vehicle speed increases from V1 to V2 due to the undulation of a traveling road. The vehicle speed is calculated based on, for example, the detection result of the rotation speed sensor 39. Since the vehicle speed often varies easily depending on the characteristics of the road, AT deceleration control using the clutches C1 and C2 is appropriate.

FIG. 5C exemplifies, as the deceleration condition, a case in which the road of the vehicle V is a downward slope. AT deceleration control using the clutches C1 and C2 is also applicable to a case in which a rise in vehicle speed caused when the vehicle V travels on the downward slope is suppressed. AT deceleration control under this deceleration condition can be executed regardless of whether the automated driving mode or the manual driving mode is currently set. For this deceleration condition, whether an inclination $\theta$ of the road is equal to or larger than a predetermined value is set as a reference, and the inclination $\theta$ can be obtained from map information stored in the database 28a.

Figure 6:
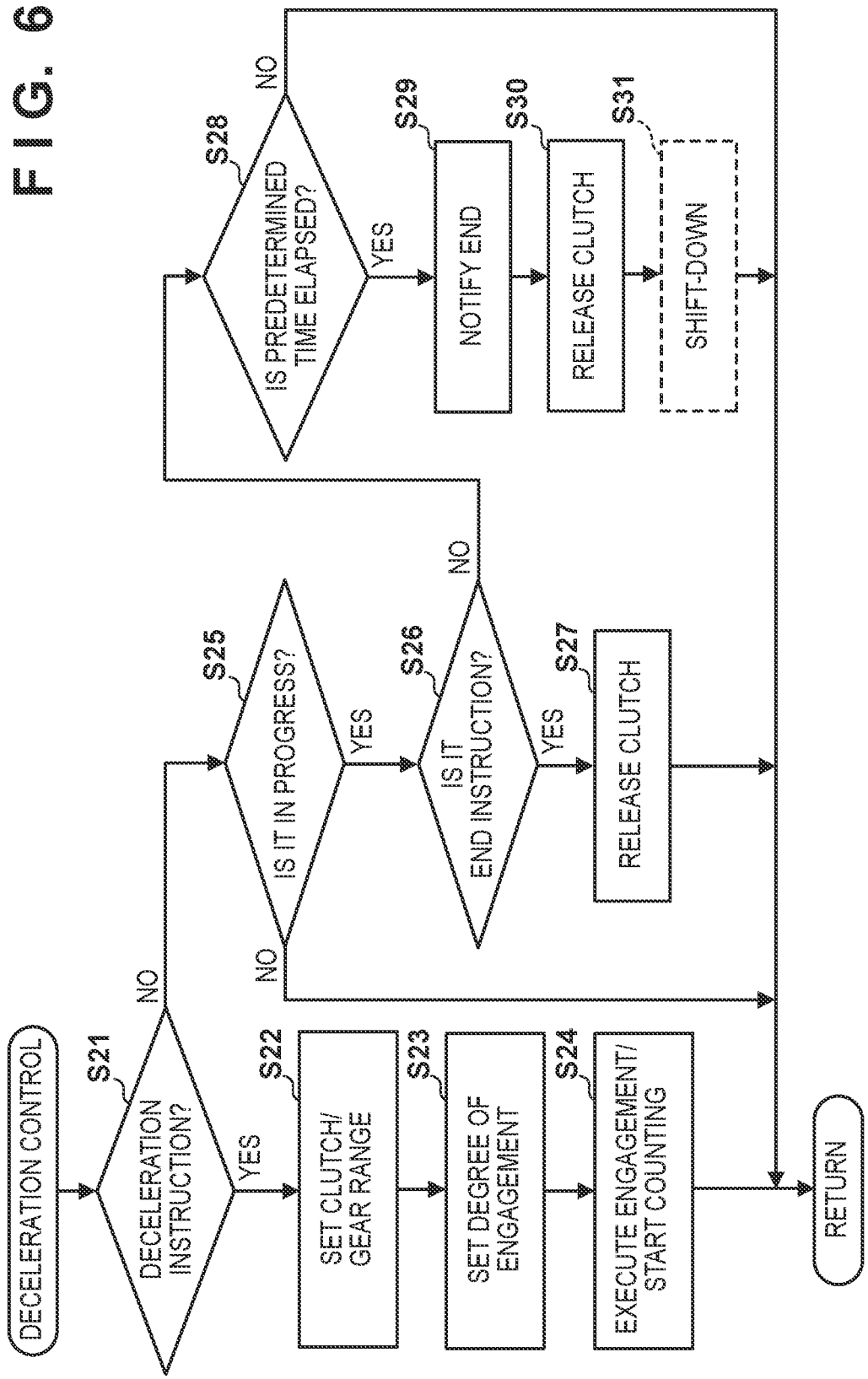
FIG. 6 is a flowchart illustrating an example of processing executed by the control apparatus for the vehicle shown in FIG. 1.

FIG. 6 shows an example of the processing of the ECU 27, and mainly shows an example of processing associated with AT deceleration control. In step S21, it is determined whether a deceleration instruction is received from the ECU 20. If a deceleration instruction is received, the fuel of the internal combustion engine Eg is cut or reduced, and the process advances to step S22; otherwise, the process advances to step S25. In step S22, one of the clutches C1 and C2, which is to undergo engagement, and a gear are set. Since the clutch C1 is in the engaging state while an odd-numbered gear is established, the clutch C2 is set and an even-numbered gear for which the shifter is to be set is set. Conversely, since the clutch C2 is in the engaging state while an even-numbered gear is established, the clutch C1 is set and an odd-numbered gear for which the shifter is to be set is set.

In step S23, the degree of engagement of the clutch set in step S22 is set. If the clutches C1 and C2 are fastened at the same time, interlock occurs, and thus the clutch set in step S22 is set in a half-clutch state. The degree of engagement can be managed by the control amount of a transmission torque. As the control amount of the transmission torque, a fixed value or a variable value according to the driving situation of the power plant 50 may be set. If a variable value is set, the control amount may be set based on at least one of the torque of the internal combustion engine Eg, the rotation speed, and the current gear of the automatic transmission AT.

In step S24, the shifter of the gear set in step S22 is set, and engagement (half-clutch) of the clutch is executed. In addition, a timer that manages the time of AT deceleration control starts counting.

Figure 7:
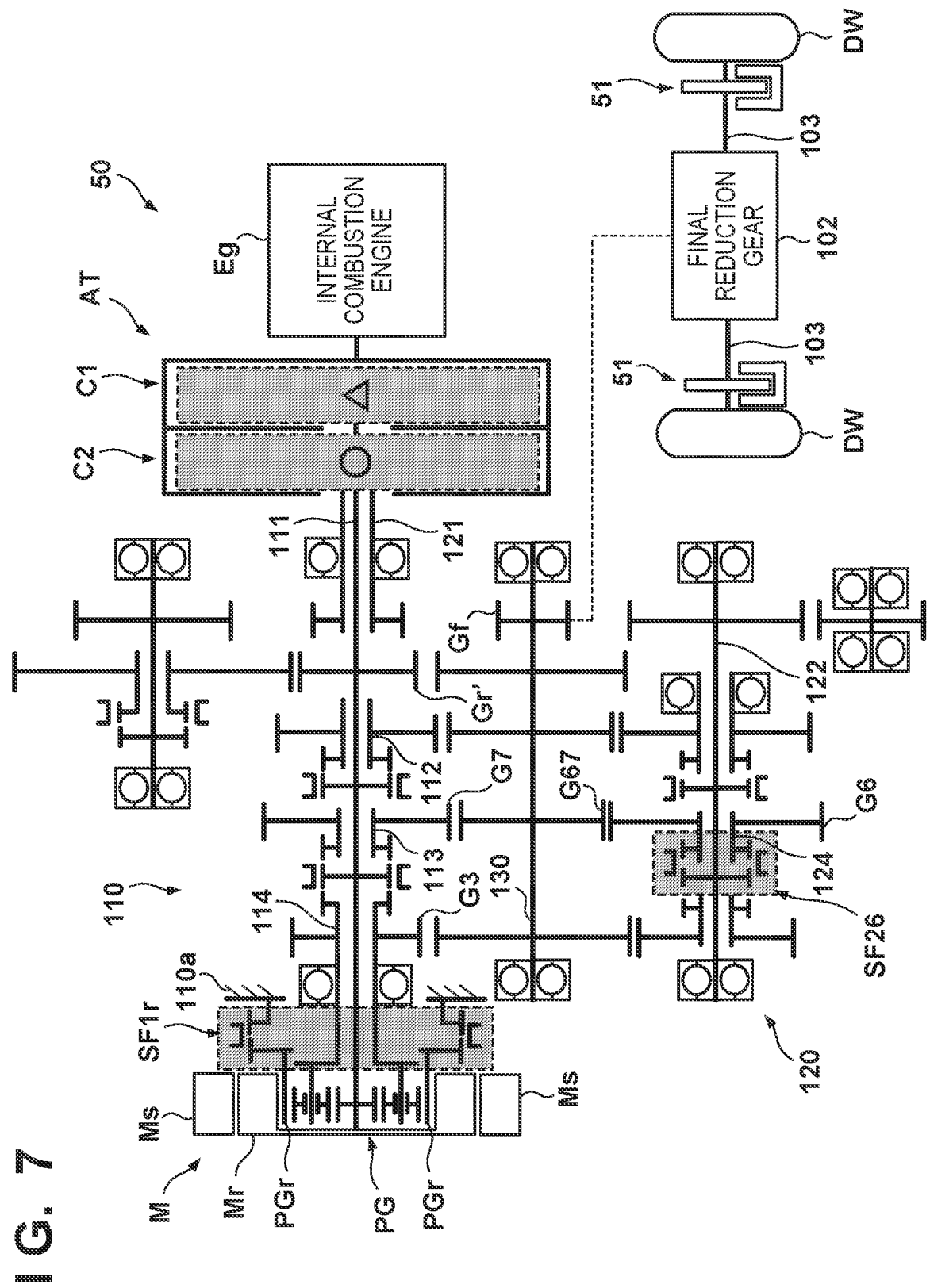
FIG. 7 is a view showing an example of the operation mode of an automatic transmission.

FIG. 7 shows an example of the operation mode of the automatic transmission AT while AT deceleration control is in progress. In the example shown in FIG. 7, a case in which a deceleration instruction is output from the ECU 20 while the 6th gear is established is exemplified. In this embodiment, the 6th gear is established by the transmission mechanism 120, and the shifter SF26 connects the intermediate shaft 122 and the connecting shaft 124 to each other in FIG. 7. The clutch C2 corresponding to the transmission mechanism 120 is in the engaging state (indicated by "◯" in FIG. 7), and the main shaft 121 and the output shaft of the internal combustion engine Eg are in the fastening state.

In this state, in-gear of the gear on the side of the transmission mechanism 110 is performed, and the degree of engagement of the clutch C1 is adjusted, thereby decelerating the vehicle V. In the example shown in FIG. 7, the shifter SF1r of the transmission mechanism 110 connects the transmission case 110a and the ring gear PGr of the planetary gear mechanism PG to each other to enter a standby state for establishment of the 1st gear on the side of the transmission mechanism 110. However, another gear such as the 3rd gear may be possible. By using a gear on a lower speed side, it is possible to improve the effectiveness of the engine brake.

When the clutch C1 is set in the half-clutch state (indicated by "Δ" in FIG. 7), the engine brake can be made effective to decelerate the vehicle V. It is possible to change the degree of deceleration in accordance with the degree of engagement of the clutch C1. As an example, Te represents the torque of the engine brake, given by:

$$Te=(\text{friction of internal combustion engine } Eg+\text{torque of clutch } C1)\times\text{ratio of 6th gear}-(\text{ratio of 1st gear}\times\text{torque of clutch } C1)$$

When the friction of the internal combustion engine Eg is set to −30 Nm, the torque of the clutch C1 is set to 20 Nm, the ratio of the 1st gear is set to 15, and the ratio of the 6th gear is set to 3, Te is given by:

$$Te=(-30\text{ Nm}+20\text{ Nm})\times 3-(15\times 20\text{ Nm})=-330\text{ Nm}$$

When only the 6th gear is used without performing the control according to this embodiment, Te is given by:

$$Te=-30\text{ Nm}\times 3=-90\text{ Nm}$$

By performing the control according to this embodiment, the effectiveness of the engine brake three times higher can be obtained. The magnitude of the engine brake can be changed based on the degree of engagement of the clutch C1 and the gear (1, 3, 5, 7) that is made to stand by on the side of the transmission mechanism 110, and the degree of engagement and the gear can be set in steps S22 and S23 of FIG. 6 in accordance with the traveling state of the vehicle V. Furthermore, it is possible to suppress a variation in rotation speed of the internal combustion engine Eg, as compared to shift-down. In addition, since the control adds control of setting the clutch C1 in the half-clutch state, it is possible to decelerate the vehicle V smoothly and quickly. Note that the degree of engagement of the clutch C1 may be changed in accordance with the actual degree of deceleration of the vehicle V during AT deceleration control without maintaining the initial value set in step S23.

Referring back to FIG. 6, in step S25, it is determined whether the AT deceleration control started in step S24 is in progress. If the AT deceleration control is in progress, the process advances to step S26; otherwise, the processing of FIG. 6 ends. In step S26, it is determined whether an end instruction (S15) is received from the ECU 20. If an end instruction is received, the process advances to step S27; otherwise, the process advances to step S28. In step S27, the clutch (the clutch C1 in the example of FIG. 7) for which engagement has been started in step S24 is released, thereby ending the AT deceleration control. After that, the processing of FIG. 6 ends.

In step S28, it is determined whether a predetermined time has elapsed since the start of the AT deceleration control by confirming the timer that has started counting in step S24. If the predetermined time has elapsed, the process advances to step S29; otherwise, the AT deceleration control continues. In the AT deceleration control, engagement is performed while sliding the friction engaging mechanism (the clutch C1 in the example of FIG. 7), and thus heat is generated by friction. To cope with this, in this embodiment, if the predetermined time has elapsed since the start of the AT deceleration control, the control ends. Note that although monitoring is performed by the time in this embodiment, monitoring may be performed by a temperature sensor. For example, in the example of FIG. 7, a method of monitoring the heat generated by the clutch C1 using a temperature sensor, and ending, if a detected temperature exceeds a threshold, the AT deceleration control.

In step S29, the ECU 20 is notified that the AT deceleration control is to end. If deceleration of the vehicle V is still insufficient, the ECU 20 that has received the notification can, for example, request the ECU 23 to actuate the brake device 51. Conversely, the ECU 20 can prevent the brake lamp 43B from lighting up frequently, at the time of deceleration when sudden deceleration exemplified in FIGS. 5A to 5C is not required, by not requesting the ECU 23 to actuate the brake device 51 before the notification is received.

In step S30, the clutch (the clutch C1 in the example of FIG. 7) for which engagement has been started in step S24 is released, thereby ending the AT deceleration control. After that, the processing of FIG. 6 ends. However, as another processing example, the process may advance to step S31 to perform shift-down. In the example of FIG. 7, after the clutch C1 is temporarily released to set the transmission mechanism 110 in a state in which the 5th gear is selected, the clutch C1 is engaged while releasing the clutch C2, thereby performing shift-down from the 6th gear to the 5th gear. Alternatively, after the clutches C1 and C2 are temporarily released to set the transmission mechanism 120 in a state in which the 4th gear is selected, the clutch C2 is engaged, thereby performing shift-down from the 6th gear to the 4th gear. In the AT deceleration control, if deceleration of the vehicle V is insufficient, it is possible to decelerate the vehicle V more reliably by performing shift-down.

<Another Embodiment of Automatic Transmission>

In the example of FIG. 7, the dual clutch type automatic transmission is exemplified as the automatic transmission AT. However, the above-described AT deceleration control is applicable to other types of automatic transmissions. An automatic transmission using a torque converter and planetary gear mechanisms will be exemplified below.

Figure 8:
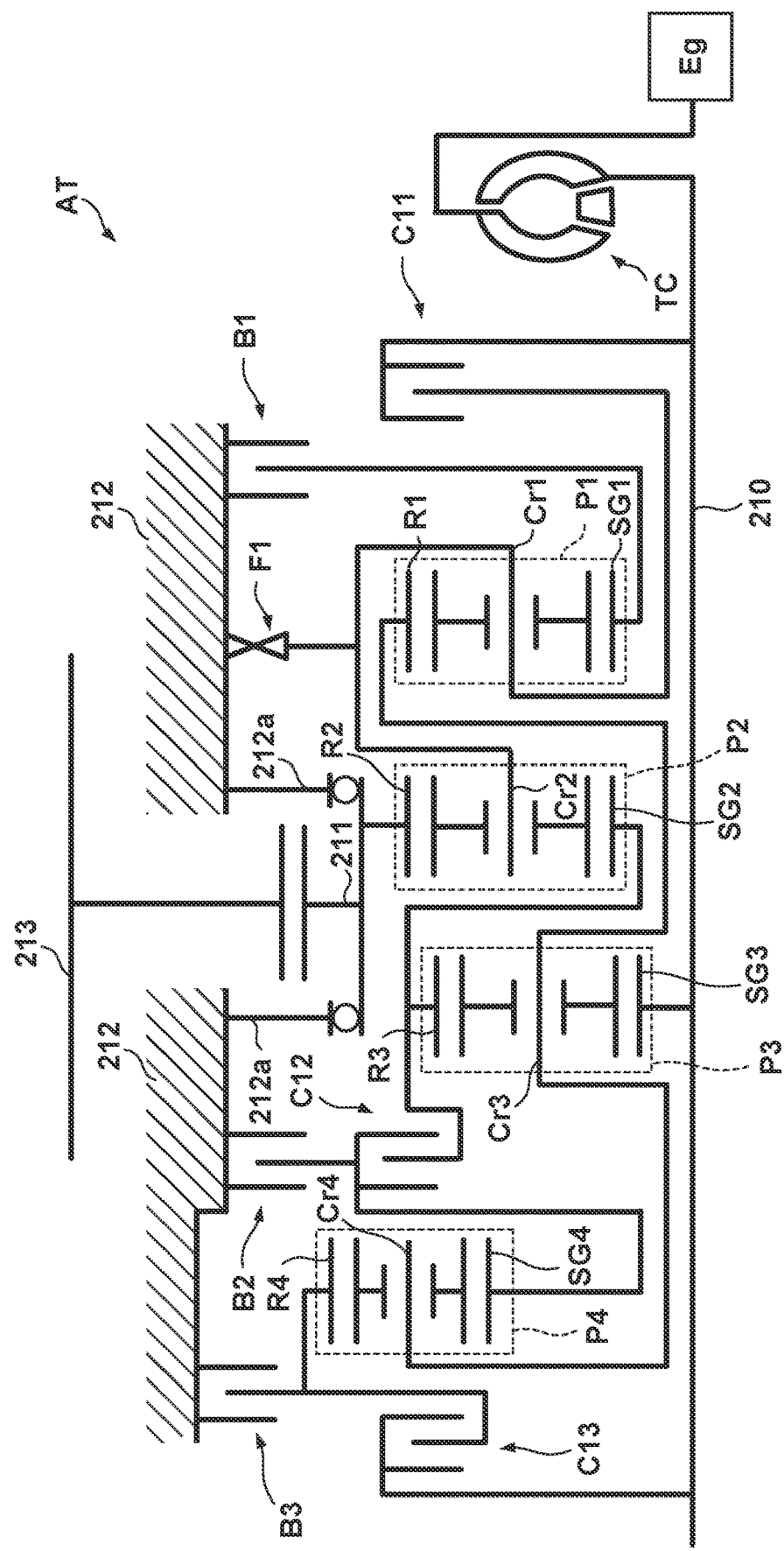
FIG. 8 is a skeleton diagram of an automatic transmission according to another embodiment.

FIG. 8 is a skeleton diagram of an automatic transmission AT according to this embodiment. The automatic transmission AT includes an input shaft 210 that is axially supported to be rotatable in a casing 212 forming a transmission case, an output member 211 that is supported, by a support member 212a supported by the casing 212, to be rotatable coaxially with the input shaft 210, and an output shaft (counter shaft) 213.

The input shaft 210 receives a driving force from an internal combustion engine Eg (to be sometimes simply referred to as Eg hereinafter), and rotates by the driving force. A starting device is provided between the input shaft 210 and the internal combustion engine Eg. In this embodiment, a torque converter TC is provided as the starting device. Therefore, the driving force of the internal combustion engine Eg is input to the input shaft 210 via the torque converter TC.

The output member 211 includes a gear concentric to the input shaft 210, and the output shaft 213 includes a gear that meshes with the gear. The rotation of the input shaft 210 changes its speed via transmission mechanisms to be described below and is then transmitted to the output shaft 213. The rotation (driving force) of the output shaft 213 is transmitted to driving wheels via, for example, differential gears and final reduction gears (not shown).

As the transmission mechanisms, the automatic transmission AT includes planetary gear mechanisms P1 to P4 and engaging mechanisms C11 to C13, B1 to B3, and F1. In this embodiment, all the planetary gear mechanisms P1 to P4 are single pinion type planetary gear mechanisms. The planetary gear mechanisms P1 to P4 transmit the driving force from the input shaft 210 to the output member 211. The planetary gear mechanisms P1 to P4 can form a plurality of driving force transmission paths. The engaging mechanisms C11 to C13, B1 to B3, and F1 switch the driving force transmission paths of the planetary gear mechanisms P1 to P4, thereby establishing a plurality of gears.

The planetary gear mechanisms P1 to P4 include sun gears SG1 to SG4, ring gears R1 to R4, and carriers Cr1 to Cr4 each supporting a pinion gear, respectively, as rotational elements (12 in total), and are disposed to be coaxial with the input shaft 210.

Each of the engaging mechanisms C11 to C13, B1 to B3, and F1 functions as a clutch or a brake. A clutch connects/disconnects the rotational elements provided in the automatic transmission AT. A brake connects/disconnects the rotational elements provided in the automatic transmission AT to/from the casing 212. The rotational elements provided in the automatic transmission AT include the input shaft 210 and the sun gears, ring gears, and carriers of the planetary gear mechanisms P1 to P4.

In this embodiment, the engaging mechanisms C11 to C13 are clutches, and the engaging mechanisms B1 to B3 and F1 are brakes. Hence, the engaging mechanisms C11 to C13 are sometimes called the clutches C11 to C13, and the engaging mechanisms B1 to B3 and F1 are sometimes called the brakes B1 to B3 and F1. When the engaging mechanisms C11 to C13 and B1 to B3 are switched between an engaging state (fastening state) and a release state, and the state of the engaging mechanism F1 is switched, the driving force transmission path from the input shaft 210 to the output member 211 is switched, and the plurality of gears are implemented.

In this embodiment, all the engaging mechanisms C11 to C13 and B1 to B3 are hydraulic friction engaging mechanisms. Examples of the hydraulic friction engaging mechanism are dry and wet single disc clutches and dry and wet multiple disc clutches.

The engaging mechanism F1 is provided between the casing 212 and predetermined rotational elements (here, the carriers Cr1 and Cr2 connected to each other). The engaging mechanism F1 can be switched between a one-way rotation permission state (to be sometimes referred to as OWC) in which the rotation of the predetermined rotational elements (carriers Cr1 and Cr2) is restricted only in one direction, and rotation in the reverse direction is permitted and a rotation inhibition state (to be sometimes referred to as TWC) in which rotation is restricted in both directions.

In the one-way rotation permission state, the same function as a so-called one-way clutch is implemented. In this state, the rotational elements transmit the driving force in one rotation direction but slip in the reverse direction. In this embodiment, the engaging mechanism F1 functions as a brake. For this reason, if the engaging mechanism F1 is in the one-way rotation permission state, the predetermined rotational elements (carriers Cr1 and Cr2) are permitted to rotate only in one direction. In the rotation inhibition state, the rotational elements transmit the driving force in both rotation directions. In this embodiment, the engaging mechanism F1 functions as a brake. For this reason, if the engaging mechanism F1 is in the rotation inhibition state, the predetermined rotational elements (carriers Cr1 and Cr2) are inhibited from rotating in both directions.

An example of the structure of the engaging mechanism F1 will be described later. For example, a known two-way clutch can be employed. Some known two-way clutches can be switched between the one-way rotation permission state, the rotation inhibition state, and a two-way rotation permission state by controlling driving of a corresponding hydraulic actuator or electromagnetic actuator. Some known two-way clutches can further switch the one-way rotation permission state between a forward rotation permission state and a reverse rotation permission state. In this embodiment, switching between the one-way rotation permission state and the rotation inhibition state suffices, and using only the permission state in one rotation direction as the one-way rotation permission state suffices. However, a two-way clutch capable of selecting another state such as the two-way rotation permission state may be employed.

The connection relationship between the components will be described next with reference to FIG. 8.

The sun gear SG3 of the planetary gear mechanism P3 is connected to the input shaft 210. The ring gear R3 is connected to the sun gear SG2 of the planetary gear mechanism P2. The carrier Cr3 is connected to the ring gear R1 of the planetary gear mechanism P1 and the carrier Cr4 of the planetary gear mechanism P4. The carrier Cr2 of the planetary gear mechanism P2 is connected to the carrier Cr1 of the planetary gear mechanism P1. The ring gear R2 is connected to the output member 211. Hence, the planetary gear mechanism P2 is a planetary gear mechanism that performs driving transmission to the output shaft 213.

The clutch C11 connects the input shaft 210 to the carrier Cr1 of the planetary gear mechanism P1 and the carrier Cr2 connected to the carrier Cr1 in the engaging state, and disconnects them in the release state. The clutch C12 connects the ring gear R3 of the planetary gear mechanism P3 to the sun gear SG4 of the planetary gear mechanism P4 in the engaging state, and disconnects them in the release state. The clutch C13 connects the input shaft 210 to the ring gear R4 of the planetary gear mechanism P4 in the engaging state, and disconnects them in the release state.

The brake B1 connects the casing 212 to the sun gear SG1 of the planetary gear mechanism P1 in the engaging state, and disconnects them in the release state. The brake B2 connects the casing 212 to the sun gear SG4 of the planetary gear mechanism P4 in the engaging state, and disconnects them in the release state. The brake B3 connects the casing 212 to the ring gear R4 of the planetary gear mechanism P4 in the engaging state, and disconnects them in the release state.

As already described, the brake F1 restricts the rotation of the carrier Cr2 of the planetary gear mechanism P2 (and the carrier Cr1 connected to the carrier Cr2) only in one direction in the one-way rotation permission state, and fixes the carrier Cr2 of the planetary gear mechanism P2 (and the carrier Cr1 connected to the carrier Cr2) to the casing 212 in the rotation inhibition state.

Figure 10:
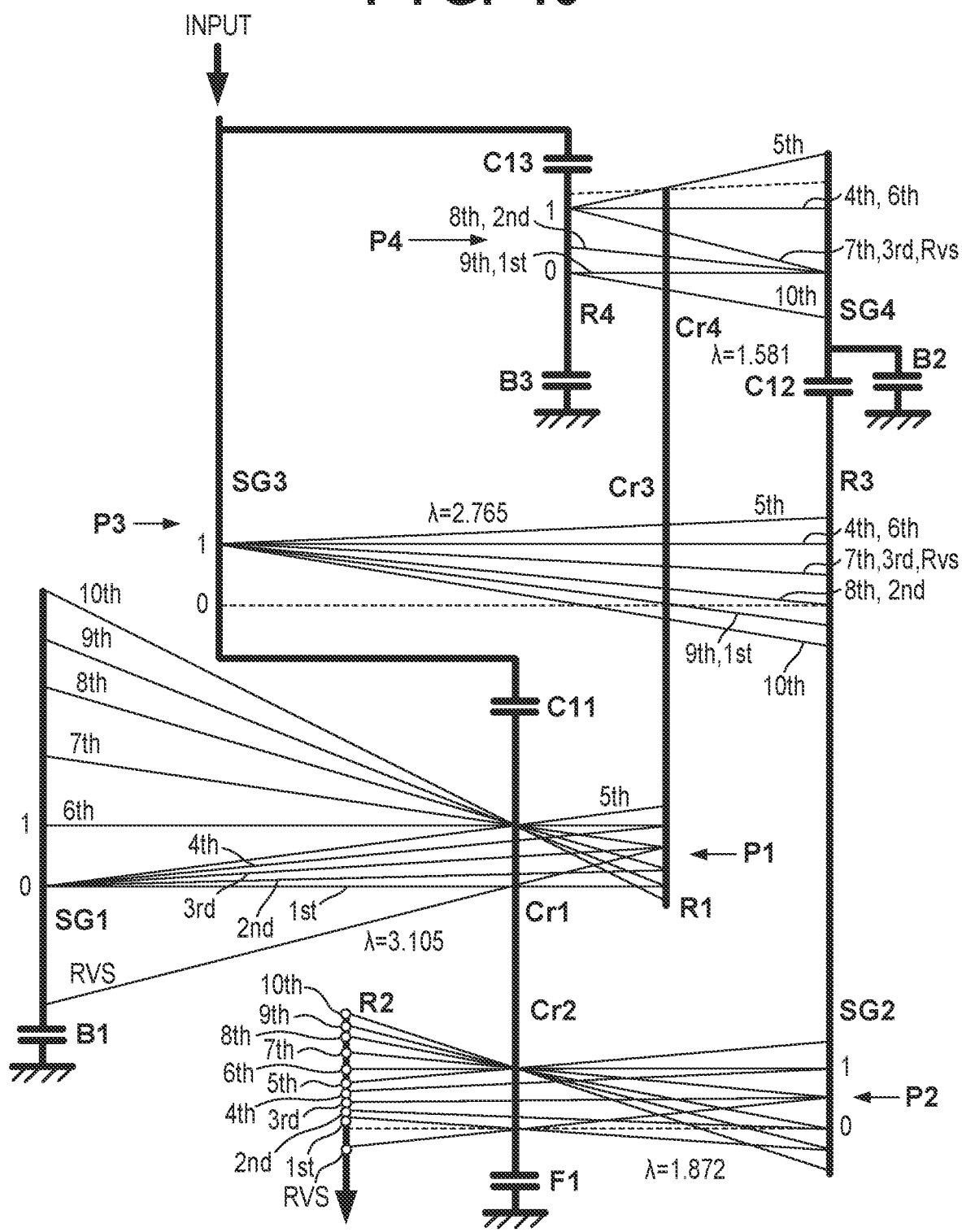
FIG. 10 is a velocity diagram of the automatic transmission shown in FIG. 8.

FIG. 9A is an engaging table (fastening table) showing the engaging combination of the engaging mechanisms provided in the automatic transmission AT. FIG. 9B shows the gear ratios of the planetary gear mechanisms provided in the automatic transmission AT. FIG. 10 is a velocity diagram of the automatic transmission AT. "Gear ratio" in FIG. 9A indicates the gear ratio between the input shaft 210 and the output member 211.

In this embodiment, a running range that transmits the driving force to the wheel side and a non-running range that does not transmit the driving force are included in selectable shift ranges. In the running range, 10 forward gears (1st to 10th) and one reverse gear (RVS) can be established. "P/N" represents non-running ranges; "P", a parking range; and "N", a neutral range.

In the example of the engaging table shown in FIG. 9A, "○" indicates the engaging state, and no mark indicates the release state. Note that there are included engaging mechanisms that are set in the engaging state for smooth change to adjacent gears, although the engagement is not essential to establish the gears. For example, in the 1st gear (1st), engagement of the brake B2 is not essential. However, when changing to the reverse gear (RVS) or 2nd gear (2nd), the brake B2 is set in the engaging state for the purpose of decreasing the engaging mechanisms to switch the engaging state. Similarly, in the 5th gear (5th), engagement of the clutch C13 is not essential. However, when changing to the 4th gear (4th) or 6th gear (6th), the clutch C13 is set in the engaging state for the purpose of decreasing the engaging mechanisms to switch the engaging state.

As for the brake F1, "○" indicates the rotation inhibition state, and "Δ" indicates the one-way rotation permission state. In the 1st gear (1st), the brake F1 can be set in either the rotation inhibition state or the one-way rotation permission state. In the rotation inhibition state, the engine brake is enabled. In the 1st gear, the brake F1 is set in the one-way rotation permission state. The engine brake is switched between the enabled state and a disabled state by engaging or releasing the brake B3. In FIG. 9A, "○" of the brake B3 in the 1st gear (1st) indicates this.

An algorithm to determine which state is set for the brake F1 in the 1st gear (1st) can appropriately be designed. In this embodiment, the state before a change to the 1st gear (1st) is inherited. For example, when changed from the reverse gear (RVS) to the 1st gear (1st), the engaging mechanism F1 remains in the rotation inhibition state in the 1st gear (1st). However, if, for example, the vehicle speed exceeds a predetermined speed, the engaging mechanism F1 is switched to the one-way rotation permission state. Similarly, when changed from other forward gears (2nd to 10th) to the 1st gear (1st), the engaging mechanism F1 remains in the one-way rotation permission state in the 1st gear (1st).

In the non-running ranges (P/N) as well, the state of the brake F1 can be either the rotation inhibition state or the one-way rotation permission state. In this embodiment, the state before a change to the non-running ranges (P/N) is inherited, as in the 1st gear (1st).

In the 2nd gear (2nd) to the 10th gear (10th), the brake F1 is set in the one-way rotation permission state, but slips because of the structure of the automatic transmission AT. For this reason, the state of the brake F1 is indicated by "(Δ)". If the brake F1 is a mechanical engaging mechanism capable of selecting the above-described two-way rotation permission state, the brake F1 can also be set in the two-way rotation permission state in the 2nd gear (2nd) to the 10th gear (10th).

Note that in this embodiment, the one-way rotation permission state is selected as the state of the brake F1 in each of the 2nd gear (2nd) to the 10th gear (10th), and these gears cannot be established in the rotation inhibition state. However, an arrangement that selects the rotation inhibition state can also be employed depending on the arrangement of the automatic transmission AT.

The velocity diagram of FIG. 10 shows the rotation speed ratio of each element to the input to the input shaft 210 in each gear. The ordinate represents the speed ratio. "1" indicates the same rotation speed as the input shaft 210, and "0" indicates a stop state. The abscissa is based on the gear ratio between the rotational elements of the planetary gear mechanisms P1 to P4. λ is the gear ratio between a carrier Cr and a sun gear S. Note that in FIG. 10, elements corresponding to the output shaft 213 are not illustrated.

In the above arrangement, an example of AT deceleration control will be described. For example, if a deceleration instruction (step S12 of FIG. 4) is output from the ECU 20 during traveling by selecting the 8th gear, the brake B1 is selected in step S22 of FIG. 6 and engagement is performed while sliding the brake B1 in step S24. If the brake B1 is fastened, an engaging combination of the 2nd and 8th gears is established (see FIG. 9A), thereby generating interlock. In this embodiment as well, it is possible to decelerate a vehicle V using the internal resistance of the automatic transmission AT, similarly to the example of FIG. 7, by performing engagement while sliding the brake B1.

Note that the example of using the brake B1 has been described. However, one of the remaining brakes B2 and B3 and the clutches C11 to C13 may be selected in accordance with the currently selected gear, as a matter of course.

<Summary of Embodiments>

1. A vehicle (for example, V) according to the above embodiment comprises:

an automatic transmission (for example, AT) configured to select a gear from a plurality of gears by switching engagement of a plurality of friction engaging mechanisms (for example, C1, C2/C11-C13, B1-B3);

a determination unit (for example, 20) configured to determine whether a predetermined deceleration condition is satisfied during traveling; and an engagement control unit (for example, 27) configured to control the plurality of friction engaging mechanisms, wherein if the determination unit determines that the predetermined deceleration condition is satisfied, the engagement control unit decelerates the vehicle by controlling, in addition to a friction engaging mechanism corresponding to a current gear among the plurality of friction engaging mechanisms, a degree of engagement of another friction engaging mechanism that can generate interlock of the automatic transmission (for example, S22-S24).

According to this embodiment, the internal resistance of the automatic resistance can generate a deceleration force without performing shift-down, and it is possible to decelerate the vehicle relatively smoothly and quickly.

2. The vehicle according to the above embodiment further comprises a traveling control unit (for example, 20) configured to execute automatic cruise that controls the vehicle to maintain a set following distance to a preceding vehicle, wherein the predetermined deceleration condition includes at least a condition that a following distance to the preceding vehicle decreases below the set following distance in the automatic cruise (for example, FIG. 5A).

According to this embodiment, in control of following the preceding vehicle, it is possible to adjust the speed on the deceleration side without requiring actuation of the brake device.

3. The vehicle according to the above embodiment further comprises a traveling control unit (for example, 20) configured to execute automatic cruise that controls the vehicle to maintain a set vehicle speed, wherein the predetermined deceleration condition includes at least a condition that a vehicle speed of the vehicle exceeds the set vehicle speed in the automatic cruise (for example, FIG. 5B).

According to this embodiment, in control of traveling while maintaining the vehicle speed within a predetermined range, the speed on the deceleration side is adjusted without requiring actuation of the brake device.

4. In the vehicle according to the above embodiment, the predetermined deceleration condition includes at least a condition that the road that the vehicle is traveling on is a downward slope (for example, FIG. 5C).

According to this embodiment, when traveling on the downward slope, it is possible to adjust the speed on the deceleration side without requiring actuation of the brake device.

5. In the vehicle according to the above embodiment, if a predetermined time has elapsed since a start of the control of the degree of engagement, the engagement control unit ends the control of the degree of engagement (for example, S24, S28, S30).

According to this embodiment, it is possible to suppress heat generation of the friction engaging mechanisms.

6. In the vehicle according to the above embodiment, if a predetermined time has elapsed since a start of the control of the degree of engagement, the engagement control unit ends the control of the degree of engagement, and shifts down the gear (for example, S31).

According to this embodiment, it is possible to further decelerate the vehicle while suppressing heat generation of the friction engaging mechanisms.

7. In the vehicle according to the above embodiment, the predetermined deceleration condition includes at least a condition that the preceding vehicle is not braked.

According to this embodiment, if the preceding vehicle is braked, even if the self-vehicle is braked, a traffic flow hardly worsens, and it is thus possible to suppress heat generation of the friction engaging mechanisms by suppressing deceleration using the friction engaging mechanisms.

8. In the vehicle according to the above embodiment, after the predetermined deceleration condition is satisfied, a brake device of the vehicle is not actuated before a predetermined condition is satisfied (for example, S29).

According to this embodiment, it is possible to prevent a traffic flow from worsening due to the lighting of a brake lamp by preventing the brake device from being actuated at the time of deceleration by the friction engaging mechanisms.

9. In the vehicle according to the above embodiment, the other friction engaging mechanism is a friction engaging mechanism corresponding to a gear lower than the current gear.

According to this embodiment, it is possible to generate a deceleration force by the internal friction of the automatic transmission.

10. In the vehicle according to the above embodiment, the automatic transmission includes a first transmission mechanism (for example, 110) configured to establish odd-numbered gears, a second transmission mechanism (for example, 120) configured to establish even-numbered gears, a first clutch (for example, C1) configured to connect/disconnect a traveling driving source and the first transmission mechanism, and a second clutch (for example, C2) configured to connect/disconnect the traveling driving source and the second transmission mechanism, and the plurality of friction engaging mechanisms comprise the first clutch and the second clutch.

According to this embodiment, it is possible to generate a deceleration force by the internal friction of a dual clutch type automatic transmission.

11. In the vehicle according to the above embodiment, the automatic transmission includes a plurality of planetary gear mechanisms (for example, P1-P4), and the plurality of friction engaging mechanisms comprise brakes or clutches (for example, C11-C13, B1-B3) connected to rotational elements provided in the plurality of planetary gear mechanisms.

According to this embodiment, it is possible to generate a deceleration force by the internal friction of a torque converter type automatic transmission.

12. A control apparatus according to the above embodiment is a control apparatus (for example, 1) for a vehicle including an automatic transmission (for example, AT) which is configured to select a gear from a plurality of gears by switching engagement of a plurality of friction engaging mechanisms (for example, C1, C2/C11-C13, B1-B3), the control apparatus comprises an engagement control unit (for example, 27) configured to control the plurality of friction engaging mechanisms, wherein if a predetermined deceleration condition is satisfied during traveling of the vehicle, the engagement control unit decelerates the vehicle by controlling, in addition to a friction engaging mechanism corresponding to a current gear among the plurality of friction engaging mechanisms, a degree of engagement of another friction engaging mechanism that generates interlock of the automatic transmission (for example, S22-S24).

According to this embodiment, it is possible to generate a deceleration force by the internal friction of the automatic transmission without performing shift-down, thereby decelerating the vehicle relatively smoothly and quickly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A vehicle comprising:
an automatic transmission configured to select a gear from a plurality of gears by switching engagement of a plurality of friction engaging mechanisms;
a determination unit configured to determine whether a predetermined deceleration condition is satisfied during traveling; and
an engagement control unit configured to control the plurality of friction engaging mechanisms,
wherein when the determination unit determines that the predetermined deceleration condition is satisfied, the engagement control unit decelerates the vehicle by controlling, in addition to a friction engaging mechanism corresponding to a current gear among the plurality of friction engaging mechanisms, a degree of engagement of another friction engaging mechanism that can generate interlock of the automatic transmission, and when a predetermined time has elapsed since a start of the control of the degree of engagement, the engagement control unit ends the control of the degree of engagement, and shifts down the gear.

2. The vehicle according to claim 1, further comprising a traveling control unit configured to execute automatic cruise that controls the vehicle to maintain a set following distance to a preceding vehicle, wherein the predetermined deceleration condition includes at least a condition that a following distance to the preceding vehicle decreases below the set following distance in the automatic cruise.

3. The vehicle according to claim 2, wherein the predetermined deceleration condition includes at least a condition that the preceding vehicle is not braked.

4. The vehicle according to claim 2, wherein after the predetermined deceleration condition is satisfied, a brake device of the vehicle is not actuated before a predetermined condition is satisfied.

5. The vehicle according to claim 1, further comprising a traveling control unit configured to execute automatic cruise that controls the vehicle to maintain a set vehicle speed, wherein the predetermined deceleration condition includes at least a condition that a vehicle speed of the vehicle exceeds the set vehicle speed in the automatic cruise.

6. The vehicle according to claim 5, wherein after the predetermined deceleration condition is satisfied, a brake device of the vehicle is not actuated before a predetermined condition is satisfied.

7. The vehicle according to claim 1, wherein the predetermined deceleration condition includes at least a condition that a road that the vehicle is traveling on is a downward slope.

8. The vehicle according to claim 1, wherein the another friction engaging mechanism is a friction engaging mechanism corresponding to a gear lower than the current gear.

9. The vehicle according to claim 1, wherein the automatic transmission includes a first transmission mechanism configured to establish odd-numbered gears, a second transmission mechanism configured to establish even-numbered gears, a first clutch configured to connect/disconnect a traveling driving source and the first transmission mechanism, and a second clutch configured to connect/disconnect the traveling driving source and the second transmission mechanism, and the plurality of friction engaging mechanisms comprise the first clutch and the second clutch.

10. The vehicle according to claim 1, wherein the automatic transmission includes a plurality of planetary gear mechanisms, and the plurality of friction engaging mechanisms comprise brakes or clutches connected to rotational elements provided in the plurality of planetary gear mechanisms.

11. A control apparatus for a vehicle including an automatic transmission which is configured to select a gear from a plurality of gears by switching engagement of a plurality of friction engaging mechanisms, the apparatus comprises an engagement control unit configured to control the plurality of friction engaging mechanisms, wherein when a predetermined deceleration condition is satisfied during traveling of the vehicle, the engagement control unit decelerates the vehicle by controlling, in addition to a friction engaging mechanism corresponding to a current gear among the plurality of friction engaging mechanisms, a degree of engagement of another friction engaging mechanism that generates interlock of the automatic transmission, and when a predetermined time has elapsed since a start of the control of the degree of engagement, the engagement control unit ends the control of the degree of engagement, and shifts down the gear.

12. A control apparatus for a vehicle including an automatic transmission which is configured to select a gear from a plurality of gears by switching engagement of a plurality of friction engaging mechanisms, the apparatus comprises a controller including at least one processor and at least one storage device which stores a program, the at least one processor controlling the plurality of friction engaging mechanisms by executing the program, wherein when a predetermined deceleration condition is satisfied during traveling of the vehicle, the controller decelerates the vehicle by controlling, in addition to a friction engaging mechanism corresponding to a current gear among the plurality of friction engaging mechanisms, a degree of engagement of another friction engaging mechanism that generates interlock of the automatic transmission, and when a predetermined time has elapsed since a start of the control of the degree of engagement, the controller ends the control of the degree of engagement, and shifts down the gear.

* * * * *